(12) United States Patent
Burt et al.

(10) Patent No.: US 10,988,121 B2
(45) Date of Patent: Apr. 27, 2021

(54) BRAKING CONTROL SYSTEM

(71) Applicant: JAGUAR LAND ROVER LIMITED, Warwickshire (GB)

(72) Inventors: Sam Burt, Coventry (GB); Marcus Fear, Coventry (GB); Vlad Rosu, Coventry (GB); Jaimie Foster, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 234 days.

(21) Appl. No.: 16/082,781

(22) PCT Filed: Feb. 21, 2017

(86) PCT No.: PCT/EP2017/053849
§ 371 (c)(1),
(2) Date: Sep. 6, 2018

(87) PCT Pub. No.: WO2017/153160
PCT Pub. Date: Sep. 14, 2017

(65) Prior Publication Data
US 2019/0084536 A1 Mar. 21, 2019

(30) Foreign Application Priority Data

Mar. 7, 2016 (GB) ..................................... 1603898

(51) Int. Cl.
*B60T 8/17* (2006.01)
*B60T 8/1769* (2006.01)
*B60W 30/18* (2012.01)

(52) U.S. Cl.
CPC ..... *B60T 8/1769* (2013.01); *B60W 30/18118* (2013.01); *B60T 2201/04* (2013.01); *B60T 2201/06* (2013.01); *B60T 2210/16* (2013.01)

(58) Field of Classification Search
CPC ............... B60T 8/1769; B60T 2210/16; B60T 2201/06; B60T 2201/04; B60W 30/18118
See application file for complete search history.

(56) References Cited

U.S. PATENT DOCUMENTS

| | | | |
|---|---|---|---|
| 6,260,934 B1* | 7/2001 | Lee ......................... | B60T 7/122 303/192 |
| 2005/0167212 A1* | 8/2005 | Pascucci ............... | B60T 13/741 188/72.2 |

(Continued)

FOREIGN PATENT DOCUMENTS

| | | |
|---|---|---|
| DE | 3921323 A1 | 6/1990 |
| DE | 102007022177 A1 | 11/2008 |

(Continued)

OTHER PUBLICATIONS

International Search Report and Written Opinion of the International Searching Authority for International application No. PCT/EP2017/053849 dated May 10, 2017.

(Continued)

*Primary Examiner* — Behrang Badii
(74) *Attorney, Agent, or Firm* — Carlson, Gaskey & Olds (57) ABSTRACT

A braking control system for an automotive vehicle having driven rear wheels which are coupled through a coupling arrangement to the front wheels of the vehicle so as to switch the vehicle between two-wheel drive mode and four-wheel drive mode, comprises an input for receiving a signal indicative of the nature of the terrain on which the vehicle is parked, wherein the nature of the terrain includes the incline of the terrain and one or more additional indicators of the nature of the terrain, and a processor configured to determine, depending on the signal, a braking force to be applied to the front wheels to brake the vehicle securely. The braking system comprises an output for providing a signal to the coupling arrangement to apply the determined braking (Continued)

force to the front wheels. The processor is also configured to receive a further signal indicative of whether the park brake of the vehicle is applied to the rear vehicle wheels, and is configured to disable the output in the event that the park brake is not applied.

19 Claims, 5 Drawing Sheets

(56) References Cited

U.S. PATENT DOCUMENTS

| | | |
|---|---|---|
| 2005/0285442 A1 | 12/2005 | Tsukasaki |
| 2008/0061624 A1* | 3/2008 | Knechtges ............ B60T 13/147 303/11 |
| 2009/0189438 A1* | 7/2009 | Beier .................... B60T 13/741 303/3 |
| 2011/0155486 A1* | 6/2011 | Iwaki ........................ B60L 7/24 180/65.1 |
| 2012/0205182 A1 | 8/2012 | Rindfleisch |
| 2013/0327605 A1* | 12/2013 | Bachmaier .............. F16D 51/08 188/361 |
| 2014/0248994 A1 | 9/2014 | Kochidomari et al. |
| 2015/0045184 A1* | 2/2015 | Nishimoto ............ B60W 10/02 477/75 |
| 2016/0109024 A1 | 4/2016 | Capito |
| 2016/0144842 A1* | 5/2016 | Jeon ...................... F16D 55/226 303/15 |

FOREIGN PATENT DOCUMENTS

| | | |
|---|---|---|
| EP | 1826055 A1 | 8/2007 |
| EP | 2489539 A1 | 8/2012 |
| GB | 2273540 A | 6/1994 |
| GB | 2523323 A | 8/2015 |
| JP | 2007181289 A | 7/2007 |
| WO | 2015/032994 A1 | 3/2015 |

OTHER PUBLICATIONS

Combined Search and Examination Report under Sections 17 and 18(3) for Application No. GB1603898.6 dated Sep. 14, 2016.

* cited by examiner

BRAKING CONTROL SYSTEM

TECHNICAL FIELD

The present disclosure relates to a braking control system for applying a variable braking force to a vehicle. In particular, not exclusively, the invention relates to a braking control system for a vehicle that is parked on an inclined surface. The invention is particularly relevant to non-permanent 4WD vehicles where the park brake acts on the rear wheels only. Aspects of the invention relate to braking control system, a method of applying a braking force to a vehicle, to a vehicle, a controller for controlling the braking system and to a non-transitory, computer-readable storage medium.

BACKGROUND

When parking a vehicle on an incline it can be difficult to hold it in place using a conventional handbrake. This becomes even more difficult if the vehicle is parked on an uneven incline or an incline with a low coefficient of friction such as on wet grass or ice. In such cases the conventional handbrake acting on a single axle may not be suitable and could result in the vehicle rolling or sliding away.

These situations are particularly applicable to vehicles that are designed for driving off-road where the user is much more likely to meet such terrain. Off-road vehicles have to be capable of driving on many different types of terrain, many of which have very low coefficients of friction, for example mud, wet grass, snow, ice and gravel. Losing control of a vehicle whilst it is parked on such terrain provides a risk to the users of the vehicle. It is therefore desirable to implement measures to improve the braking force distribution applied to a vehicle that is parked on an incline and/or low friction terrain.

Most conventional handbrakes currently lock the rear two wheels of the vehicle using, for example, a drum brake that is operated by the driver via a lever or electronic button. This is sufficient for the majority of situations but when the vehicle is parked facing down an incline the weight of the vehicle may transfer to the unconstrained, front wheels causing the vehicle to move. Equally if the vehicle is parked on an incline with the rear wheels on a low friction surface and the front wheels on a high friction surface then it may also roll or slide.

These problems can be overcome by braking all four wheels of the vehicle. By locking all four wheels the braking force on the vehicle is increased significantly meaning the vehicle can be secured on the majority of inclined surfaces.

In non-permanent 4WD vehicles the vehicle can be driven in either 4WD or 2WD mode. When the vehicle is driven in 2WD mode the handbrake acts by locking the rear two wheels of the vehicle. In 4WD mode, the rear two wheels can be locked using the park brake and the centre driveline clutch mechanism, which transmits the braking force, is applied to transfer braking force to the front wheels. This provides a secure method of parking; however the clutch mechanism can be overstressed by parking in this manner and as a result the life of the clutch mechanism can be significantly reduced. It is therefore desirable to develop a method to lock all four wheels within a vehicle in such a way that the clutch mechanism is not damaged.

It is against this background that the present invention has been devised.

SUMMARY OF THE INVENTION

Aspects and embodiments of the invention provide a braking control system, a vehicle, a centre coupling and a centre coupling controller as claimed in the appended claims. According to an aspect of the present invention, there is provided a braking control system for an automotive vehicle having driven rear wheels which are coupled through a coupling arrangement to the front wheels of the vehicle so as to switch the vehicle between two-wheel drive mode and four-wheel drive mode, the braking control system comprising an input for receiving a signal indicative of the nature of the terrain on which the vehicle is parked, wherein the nature of the terrain includes the incline of the terrain and one or more additional indicators of the nature of the terrain; a processor configured to determine, depending on the signal, a braking force to be applied to the front wheels to brake the vehicle securely; and an output for providing a signal to the coupling arrangement to apply the determined braking force to the front wheels. The processor is also configured to receive a further signal indicative of whether the park brake of the vehicle is applied to the rear vehicle wheels and is configured to disable the output in the event that the park brake is not applied.

Typically, the invention is applicable to a vehicle in which the transmission park brake and the electronic/hand park brake act on the rear wheels only.

The invention provides the advantage that, in circumstances when it would be beneficial to transfer a braking force to the front vehicle wheels, such as when the vehicle is parked on an incline, the coupling arrangement is automatically actuated to apply a suitable force. However, in other circumstances, where it is not necessary to actuate the centre coupling to apply such force, no force is applied. This provides the further advantage that the centre coupling is only utilised when absolutely necessary, prolonging service life.

In one embodiment, the one or more additional indicators of the nature of terrain may include information about the surface friction of the terrain and the type of terrain.

This embodiment gives the braking control system the ability to accurately determine an appropriate braking force to apply to the front wheels in order to constrain the vehicle on any given terrain or incline.

In one embodiment the processor within the braking control system may be configured to receive a predetermined threshold representing an inclination of the terrain below which no braking force is required at the front wheels to brake the vehicle securely, and wherein the processor may be configured to determine, depending on the signal, that no braking force is required at the front wheels in the event that the inclination of the terrain is less than the predetermined threshold. With reference to receiving a predetermined threshold, the processor may be configured to store a threshold which is then accessed several times for comparison with a measured inclination.

This gives the advantage of only applying a coupling torque to the front wheels in situations where it is necessary in order to constrain the vehicle securely. This prevents excessive wear of the coupling mechanism.

This ensures that the coupling torque is only applied to the front wheels when the user of the vehicle wishes to park the vehicle and has applied the park brake.

In one embodiment the braking control system may receive an input signal to the processor that may include data from any one of the following sources: a system for controlling the descent of a vehicle down an incline (such as a Hill Descent Control (HDC) system), a system for adjusting or enabling adjusting of vehicle parameters in dependence on the terrain on which the vehicle is travelling (such as a Terrain Response® (TR) system), a number of longitudinal acceleration sensors and a number of suspension height sensors.

In another embodiment the processor within the braking control system is configured to determine a weight distribution for the vehicle, and to further determine the braking force in dependence on the weight distribution. The weight distribution can be determined from the Gross Vehicle Mass (GVM), the output from the suspension height sensor, the output from the longitudinal acceleration sensor and optionally from a trailer input signal to indicate whether a trailer is connected to the vehicle.

In one embodiment the calculation of the braking force is based on the coupling torque history of the driving cycle.

Determining braking force based on weight distribution and/or coupling torque history allows the braking control system to accurately determine the magnitude of the necessary coupling torque to be applied.

In one example, the coupling arrangement may be a clutch mechanism and the braking force to be applied to the front wheels may be in the form of an applied torque from the clutch mechanism. The coupling arrangement may, but need not, be supplied as part of the braking control system.

In one embodiment of the invention the processor is configured to receive an input from a range change unit of the vehicle drivetrain, and wherein the processor is configured to release the braking force when the range change unit indicates a range change.

According to another aspect, there is provided a vehicle provided with a braking control system according to the previous aspect of the invention.

According to another aspect of the invention, there is provided a method of applying a braking force to the front wheels of a vehicle having a coupling arrangement for coupling rear wheels of the vehicle to the front wheels, the method comprising: receiving a signal indicative of the nature of the terrain on which the vehicle is parked, wherein the nature of the terrain includes the incline of the terrain and one or more additional indicators of the nature of the terrain, determining, dependent on the signal, a braking force to be applied to the front wheels to brake the vehicle securely, providing a signal to the coupling arrangement to apply the determined braking force to the front wheels, receiving a further signal indicative of whether the park brake of the vehicle is applied to the rear vehicle wheels, and disabling the signal to the coupling arrangement in the event that the park brake is not applied.

According to another aspect of the invention, there is provided a controller for controlling a braking system of a vehicle, the controller comprising an electronic processor having an electrical input for receiving a signal indicative of the nature of the terrain on which the vehicle is parked, wherein the nature of the terrain includes the incline of the terrain and one or more additional indicators of the nature of the terrain, an electronic memory device electrically coupled to the electronic processor and having instructions stored therein, the processor being configured to access the memory device and execute the instruction stored therein such that it is operable to: control the braking system in response to receiving a signal indicative of the nature of the terrain on which the vehicle is parked determine, depending on the signal, a braking force to be applied to the front wheels to brake the vehicle securely and provide an output signal to the coupling arrangement to apply the determined braking force to the front wheels. The processor is also configured to receive a further signal indicative of whether the park brake of the vehicle is applied to the rear vehicle wheels and is configured to disable the output in the event that the park brake is not applied.

According to another aspect of the invention, there is provided a non-transitory, computer-readable storage medium storing instructions thereon that when executed by one or more electronic processor causes the one or more electronic processors to carry out a method in accordance with a previous aspect of the invention.

Within the scope of the application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

One or more embodiments of the invention will now be described, by way of example only, with reference to the accompanying drawings, in which.

DETAILED DESCRIPTION

A specific embodiment of the invention will now be described in which numerous specific features will be discussed in detail in order to provide a thorough understanding of the inventive concept as defined in the claims. However, it will be apparent to the skilled person that the invention may be put in to effect without the specific details and that in some instances, well-known methods, techniques and structures have not been described in detail in order not to obscure the invention unnecessarily.

Figure 1:
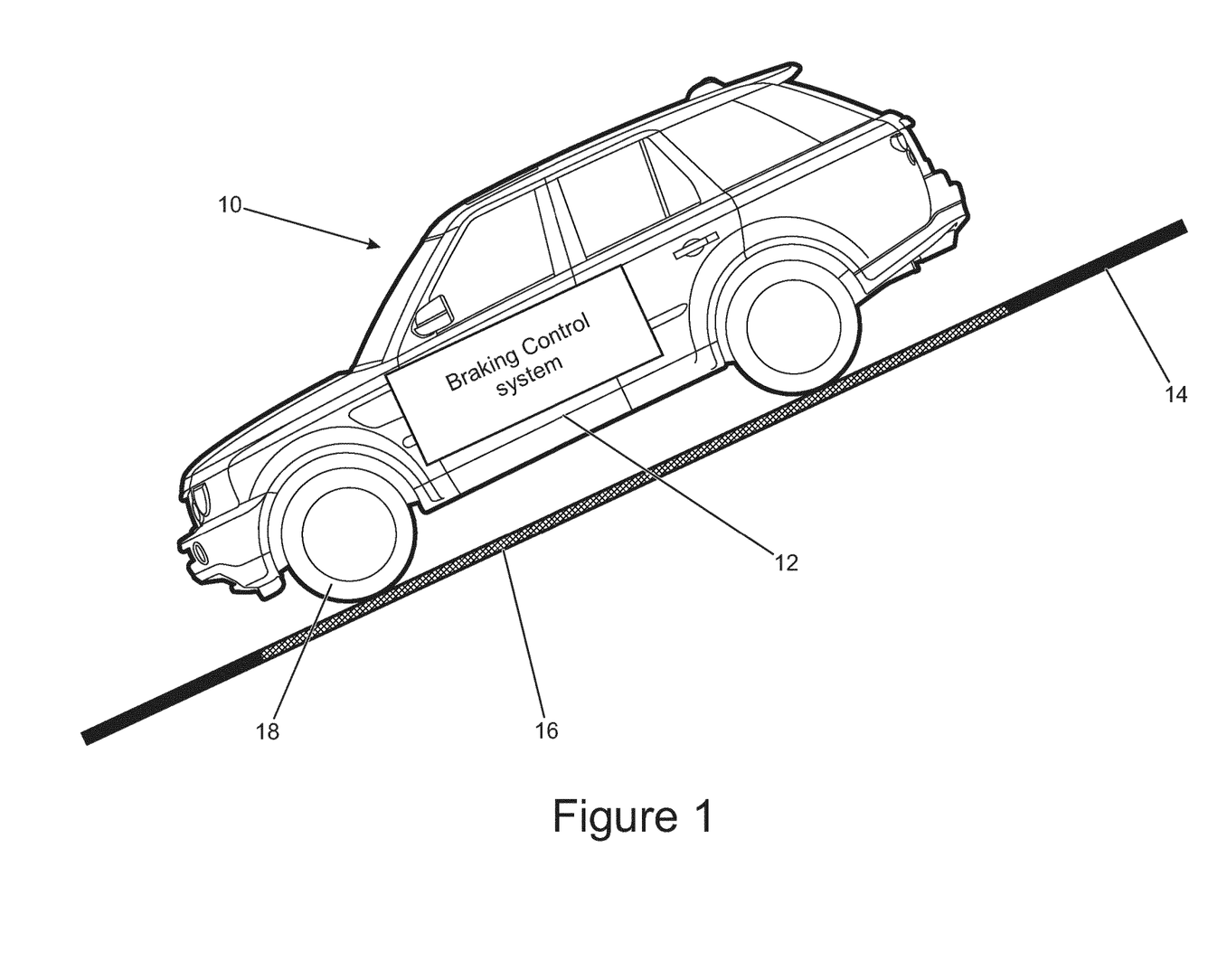
FIG. 1 is a schematic of a vehicle with which a braking control system of the invention may be used.
Figure 2:
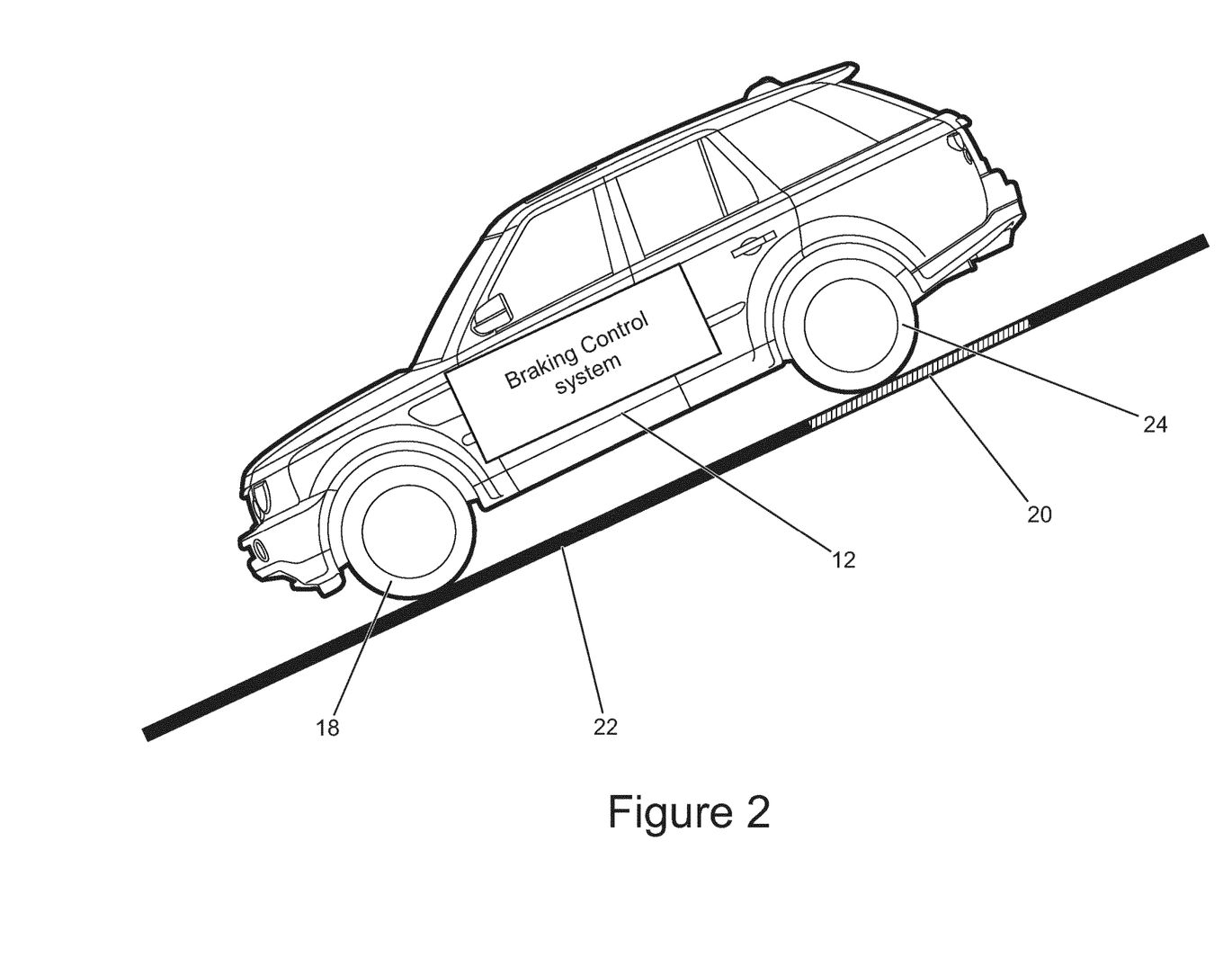
FIG. 2 is a schematic of the vehicle in FIG. 1 parked on an inclined surface where only the rear wheels are parked on a surface with a low coefficient of friction.

An object of the invention is to provide a braking control system for an automotive vehicle that can apply a variable braking force, across both axles, through the application of a coupling torque particularly when the vehicle is parked on an incline. The invention is particularly, but not exclusively, relevant to situations where the vehicle is parked on an incline with a low coefficient of friction. In order to place the embodiments of the invention in a suitable context, reference will firstly be made to a vehicle parked on an incline as shown in FIG. 1. FIG. 1 shows the vehicle 10 parked on an inclined surface 14 where the surface has a consistent medium coefficient of friction 16. The vehicle includes a braking control system 12. FIG. 2 shows a schematic of the vehicle parked on a surface where the coefficient of friction differs 20 and thus, in this situation, the front wheels 18 are parked on a high coefficient of friction surface 22 and the rear wheels 24 are parked on a low coefficient of friction surface 20. In both of these cases the weight of the vehicle 10 tends to transfer to the unconstrained, front wheels 18, causing the vehicle 10 to roll. It is this problem that the braking control system 12 looks to address.

Figure 3:
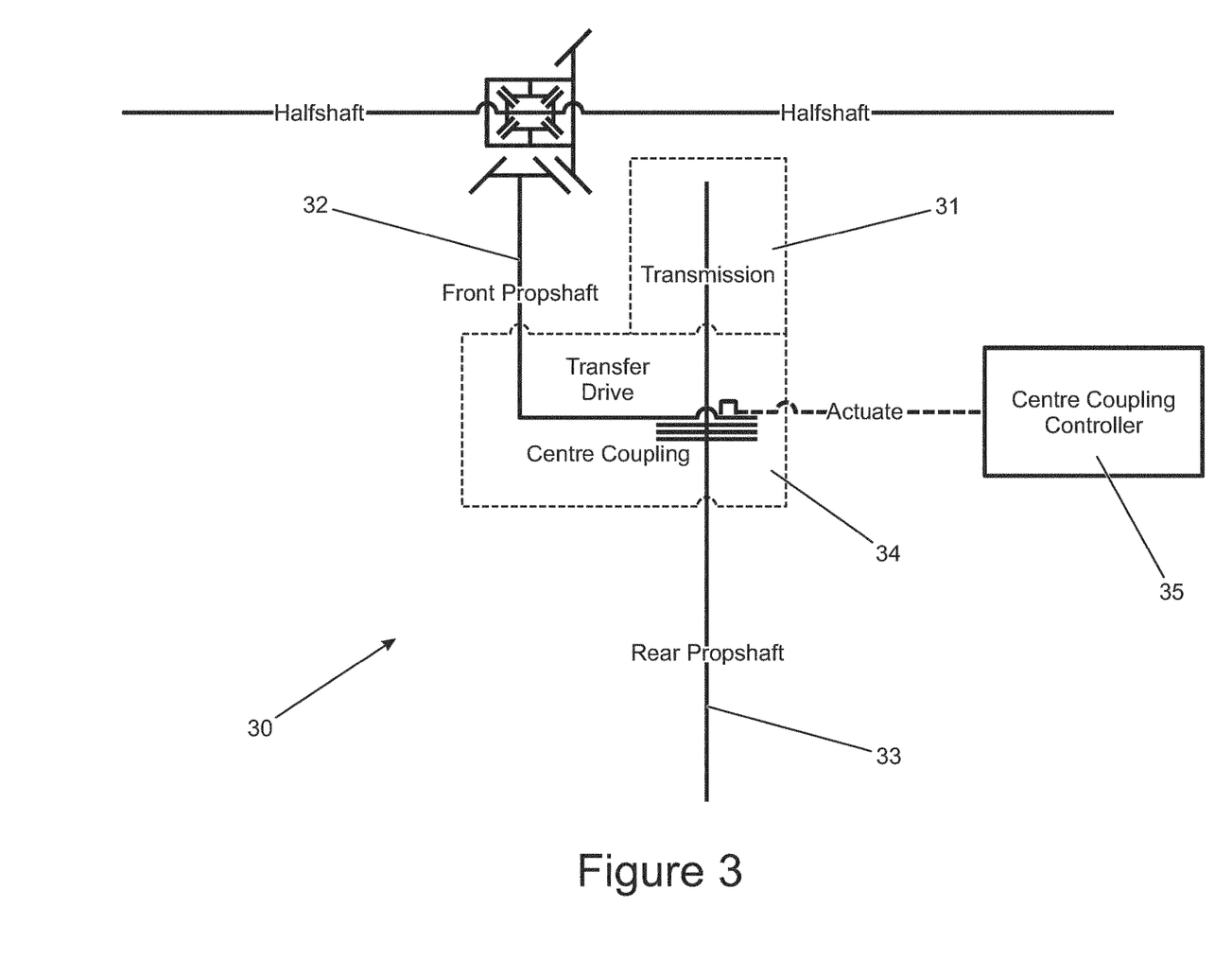
FIG. 3 is a schematic of a driveline within the vehicle in FIG. 1.

The vehicle 10 includes front and rear axles, a variable two-wheel drive or four-wheel drive powertrain, a transmission, a park brake and a foot brake. With reference also to FIG. 3, a typical driveline 30 for the vehicle will be introduced. The vehicle transmission 31 is connected to the front 32 and rear prop shafts 33 via a centre coupler 34, typically in the form of a clutch. The centre coupler 34 is actuated by a centre coupling controller 35 forming part of the braking control system 12 which varies the vehicle 10 between two-wheel drive mode and four-wheel drive mode. The front and rear prop shafts 32, 33 transfer power to the front 18 and rear 24 wheels respectively. This powertrain arrangement is just one possible way of implementing the braking control system 12.

Figure 4:
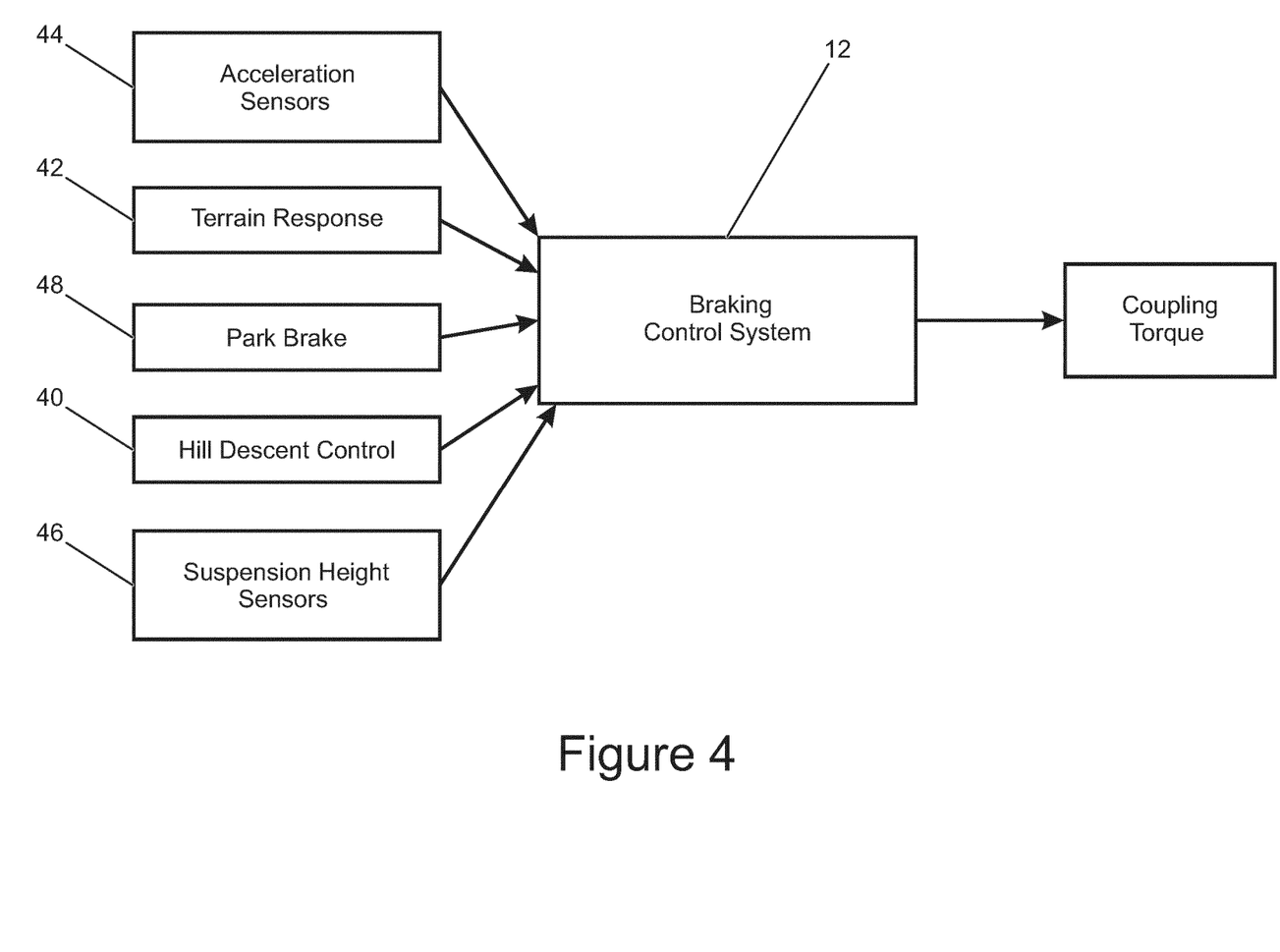
FIG. 4 is a block diagram showing the input and output signals within the processor of the braking control system of the vehicle in FIG. 1.

Referring also to FIG. 4, the vehicle 10 also includes a Hill Descent Control (HDC) system 40, a Terrain Response® (TR) system 42, a plurality of acceleration sensors 44 and suspension height sensors 46. It should be noted at this point that this is just one example of how the braking control system 12 could be implemented and the vehicle 10 does not necessarily require all of the components shown in FIGS. 1 to 4.

Terrain Response® 42 is a system that can be fitted to vehicles that allows the user to adjust the vehicles settings depending on the type of terrain. The types of terrain that the TR system 42 is designed to work on are generally surfaces with a low coefficient of friction such as wet grass, ice, mud or gravel to name a few. Typically, different driving modes for a TR system 42 may include Mud and Ruts (MR), on-road, and Grass, Gravel and Snow (GGS). The system varies parameters of the vehicle 10 such as the anti-lock brakes or responsiveness of the steering in order to maximise the vehicle's performance on a variety of surfaces. The user can define the surface the vehicle 10 is driving on or the vehicle 10 can be set to automatically detect the surface type. Different manufacturers may refer to Terrain Response by a different name, but many vehicles may provide the general function of enabling different parameters of the vehicle to be set or adjusted dependent on terrain types upon which the vehicle is travelling.

Hill Descent Control 40 is a system that allows the smooth and controlled descent of a steep and or uneven hill. The vehicle 10 automatically controls the speed of each wheel individually using the Anti-Lock Brake (ABS) system of the vehicle 10 as the vehicle 10 descends. This system is often used in conjunction with the TR system 42 for descending steep, off-road hills. Different manufacturers may refer to Hill Descent Control by a different name, but many vehicles may provide the general function of enabling the smooth and controlled descent of a steep and/or uneven hill by automatically braking the vehicle.

In use, the braking control system 12 receives a signal indicative of the nature of the terrain on which the vehicle 10 is travelling. The signal is processed by the braking control system 12 and an appropriate braking force is then calculated in order to brake the vehicle 10 securely. The braking control system 12 outputs a signal containing the calculated braking force that is sent to the centre coupling controller 35 which delivers the required torque to ensure the appropriate braking force is applied.

Figure 5:
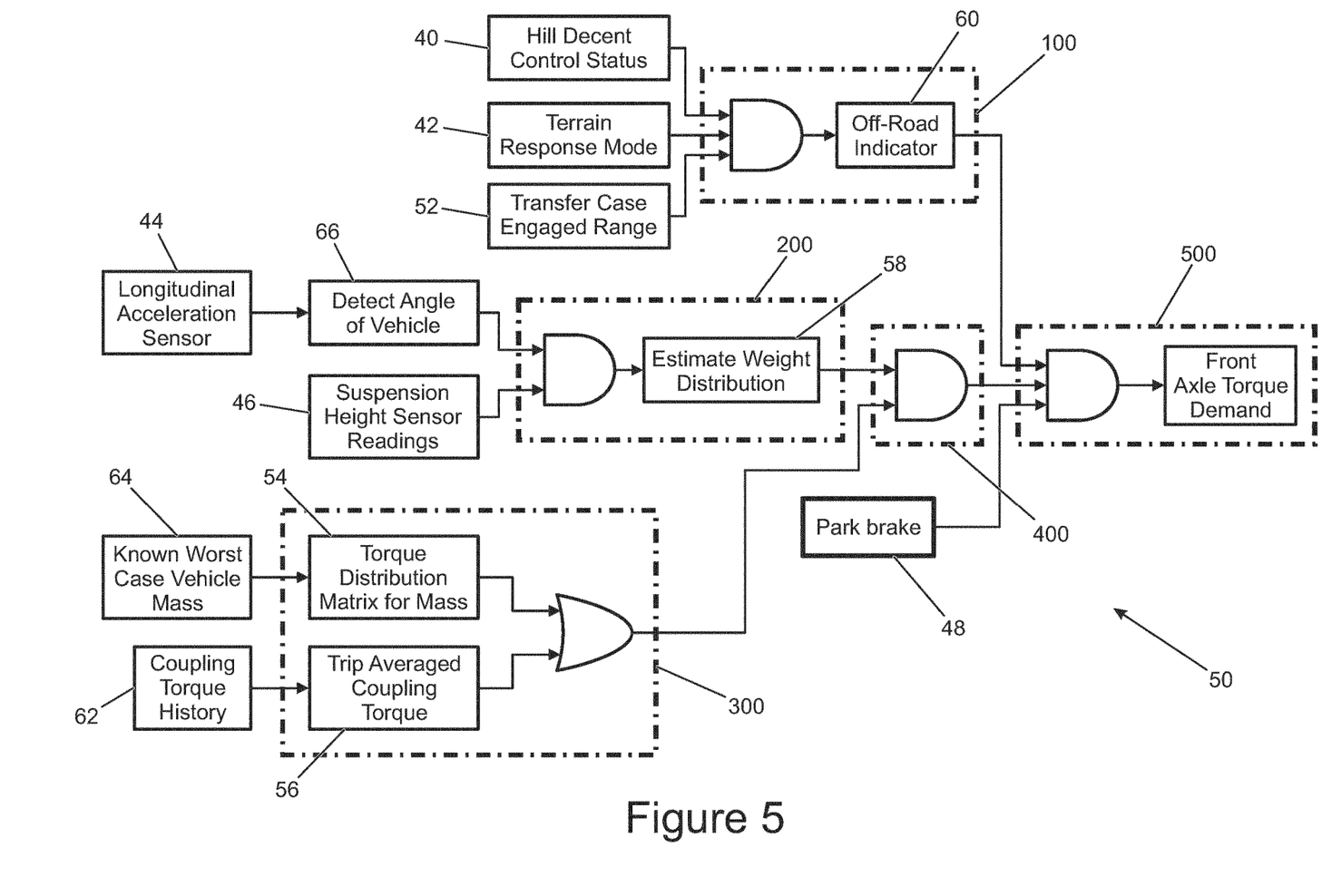
FIG. 5 is a logic diagram showing the flow of information within the braking control system of the vehicle in FIG. 1.

The braking control system 12 includes a processor for executing the logic diagram shown in FIG. 5. The braking control system 12 receives various signals from the vehicle sensors and systems and uses various data processing modules to firstly determine whether it is appropriate to apply a braking force to the front vehicle wheels, and secondly the magnitude of the appropriate braking force which should be applied.

The processor includes a first determining module 100 for determining whether the vehicle 10 is travelling off-road 60, a second determining module 200 for determining an estimate of the vehicle weight distribution 58, a third determining module 300 for determining the torque being applied to the wheels, a fourth determining module 400 for determining if outputs have been received from the second 200 and third 300 determining modules and a fifth determining module 500 for determining the front axle torque demand. The fifth determining module 500 provides the output signal from the processor, which in turn determines the braking force which is transferred to the front vehicle wheels 18.

Considering first the function of the first determining module 100, the module includes an AND gate which receives the output signal from the HDC system 40 and the output signal from the TR system 42, together with a signal from a transfer case engage range determining module 52. The transfer case engage range determining module 52 is a module which determines if the vehicle 10 is being driven in two-wheel drive or four-wheel drive mode. When the first determining module 100 receives a positive signal from all three of the HDC system 40, the TR system 42 and the transfer case engaged range 52 a positive output signal is provided to the fifth determining module 500 which is an indication that the vehicle is travelling off-road.

The second determining module 200 is used to produce a signal indicative of the weight distribution of the vehicle 58. The second determining module 200 includes an AND gate which receives a signal containing information about the vehicle's weight distribution from the longitudinal acceleration sensors 44 and the suspension height sensors 46. When the second determining module 200 receives an input from the longitudinal acceleration sensors 44 and the suspension height sensors 46 then an estimation of the vehicles weight distribution 58 can be calculated and an output is provided to the fourth determining module 400. The second determining module 200 only determines an estimation of the weight distribution if an input is received at the AND gate from both sensors 44, 46. The longitudinal acceleration sensors 44 detect the angle of the vehicle 66 and the second determining module is configured so that if the angle of the vehicle 66 is less than a predefined, critical value then the second determining module 200 will not provide an output signal. If no output signal is provided from the second determining module 200 then no braking force is applied to the front wheels 18.

The third determining module 300 is used to produce a signal indicative of the required coupling torque. The third determining module 300 includes an OR gate which receives a signal containing information about the coupling torque history 62 and another signal containing information about the known worst case vehicle mass 64.

The coupling torque history 62 can be defined as the amount of torque required for the vehicle 10 to ascend various gradients during a particular drive cycle. The coupling torque history 62 behaves like a learning function as it is constantly updates as the vehicle travels on various gradients and terrains. Furthermore, it can be refined to remember only the torque history for the current terrain mode. For example if the vehicle 10 has been driving in the 'Mud and Ruts' mode and is then changed to being driven in the 'On-Road' mode then the coupling torque history 62 will be stored and reset for the new driving mode. This allows the vehicle to store different coupling torque histories specific to each driving mode. The coupling torque history can also be linked to the geographical location of the vehicle 10 via GPS. This allows the vehicle to build a database of drive cycle data based upon location.

The worst case vehicle mass 64 can also be referred to as the Gross Vehicle Mass (GVM). This is the maximum mass that the vehicle 10 is likely to experience bearing in mind, for example, maximum occupancy, load carrying ability and maximum fueling. The GVM can be used for the mass estimation used in the calculation of coupling torque requirements. In situations where there is no signal available, for example from the suspension height sensors 46 or accelerometers 44, then the GVM will be used to provide an estimate of the vehicles mass.

The braking control system 12 can also use a signal from a trailer detection system to determine when a trailer is connected. When a trailer is detected the Gross Train Weight (GTW) is added to the GVM when estimating the total mass of the vehicle 10. This estimated mass is then used when considering the worst case vehicle mass when calculating the coupling torque requirements.

The third determining module 300 uses the first signal, containing information about the known worst case vehicle mass 64, to create a torque distribution matrix for mass 54. The second signal uses the coupling torque history 62 to calculate the trip average coupling torque 56. When the OR gate of the third determining module 300 receives an input from either one or both of the input signals then a positive output signal is sent from the third determining module 300 to the fourth determining module 400.

The fourth determining module 400 includes an AND gate which receives inputs from the second and third determining modules 200, 300. When the fourth determining module 400 receives positive inputs from both the second and third determining modules 200, 300 an output signal is sent to the fifth determining module 500.

The fifth determining module 500 is the final determining module in the braking control system 12. The fifth determining module includes an AND gate and which receives inputs from the park brake 48, the fourth determining module 400 and the first determining module 100. When all of the necessary inputs are satisfied at the AND gate of the fifth determining module 500 the module outputs a signal which is sent to the centre coupling controller 35 requesting that a braking force is applied to the front prop shaft 32.

If the input signal to the braking control system 12 satisfies the logic criteria shown in FIG. 5 then a positive signal will be sent to the centre coupling controller 35. The centre coupling controller 35 will actuate the centre coupling 34 which applies a coupling torque to the front prop shaft 32 which in turns applies a torque to the front wheels 18 to brake the vehicle 10 securely. The magnitude of the braking force that is applied could be determined from any of the inputs to the braking control system 12 and is calculated by the braking control system 12 depending on the information available to the braking control system 12 in any given configuration.

The braking control system 12 does not always apply a coupling torque to the front wheels 18 when the park brake 48 is active. The processor in the braking control system 12 will only activate the coupling torque if all of the necessary criteria are satisfied as described previously which helps to prevent excessive wear and compression of the clutch by limiting its usage to only those situations where it is essential.

The amount of torque applied by the centre coupling 34 can be varied to suit the type of terrain the vehicle 10 is driving on. In one example the TR system 42 is set to Rock Crawl mode then the vehicle 10 will apply the full coupling torque to the front wheels 18 whenever the park brake 48 is activated. This is because loose rocks can be very unstable and often at least one wheel will not be in contact with the ground, it is for this reason that it is desirable to apply the maximum braking force possible in order to safely constrain the vehicle 10.

This is not always the case, so that if the TR system 42 is set to "Mud and Ruts", for example, then the input signal to the first determining module 100 will contain a different element in the off road indicator 60 signal. In this mode the braking control system will apply a variable coupling torque, the magnitude of which is dependent on the data from the longitudinal acceleration sensors 44 as well as the suspension height sensors 46. Using the output data from these sensors along with information from the TR system 42, the braking system 12 can calculate an appropriate value of torque to apply to the front wheels 18 in order to secure the vehicle 10.

The braking system 12 can calculate the appropriate force to apply to the vehicle 10 in a number of ways. One method is to store the coupling torque history of the vehicle 10; this method allows the braking control system 12 to trip average the coupling torque 56 over a period prior to the application of the park brake 48 and as a result can calculate an appropriate braking force from all of the inputs to the braking control system 12. If however, the coupling torque history is unavailable, then the processor would use the known worst case vehicle mass 64 along with data from the other systems on the vehicle 10 to estimate a suitable braking force.

When the vehicle 10 is parked with the coupling torque activated the user may wish to request a transmission range change. When this situation arises the braking control system 12 acknowledges that it cannot continue to apply the coupling torque and so the braking control system 12 interfaces with the foot brake. When a range change is requested the braking control system 12 applies the foot brake as the coupling torque is released. The braking control system 12 can recognise when the range change has taken place and the coupling torque is then reapplied on the condition that the park brake 48 remains engaged. This process ensures that a suitable braking force is constantly being applied to the vehicle 10 throughout the duration of the range change.

The braking control system 12 does not need the vehicle 10 to be switched on in order for the coupling torque to be applied. This feature allows the vehicle 10 to be shut down and remain securely in a parked position. This can be achieved by locking the centre coupling 34 in place when the vehicle 10 is shut down so that the coupling torque applied to the front brakes is held constant.

Many modifications may be made to the above examples without departing from the scope of the present invention as defined in the accompanying claims.

The invention claimed is:
1. A braking control system for an automotive vehicle having driven rear wheels which are coupled through a coupling arrangement to front wheels of the automotive vehicle so as to switch the automotive vehicle between a two-wheel drive mode and a four-wheel drive mode, the braking control system comprising:

an input for receiving a first signal indicative of a nature of a terrain on which the automotive vehicle is parked, wherein the nature of the terrain includes an incline of the terrain and at least one additional indicator of the nature of the terrain;

a processor configured to determine, depending on the first signal, a braking force to be applied to the front wheels of the automotive vehicle to brake the automotive vehicle securely; and an output for providing an output signal to the coupling arrangement to apply the determined braking force to the front wheels of the automotive vehicle;

wherein the processor is configured to receive a second signal indicative of whether a park brake of the automotive vehicle is applied to the driven rear wheels, and is configured to disable the output in the event that the park brake is not applied.

2. The braking control system as claimed in claim 1, wherein the one or more additional indicators of the nature of the terrain includes one or both of a surface friction of the terrain and a type of the terrain.

3. The braking control system as claimed in claim 2, wherein the processor is configured to receive a predetermined threshold representing an inclination of the terrain below which no braking force is required at the front wheels of the automotive vehicle to brake the automotive vehicle securely, and wherein the processor is configured to determine, depending on the first signal, that no braking force is required at the front wheels of the automotive vehicle in the event that the first signal indicates that the inclination of the terrain is less than the predetermined threshold.

4. The braking control system as claimed in claim 1 wherein the processor is configured to receive an input signal that includes data from a Hill Descent Control system of the automotive vehicle.

5. The braking control system as claimed in claim 1, wherein the processor is configured to receive an input signal that includes an output from a terrain response system of the automotive vehicle.

6. The braking control system as claimed in claim 1, wherein the processor is configured to receive an input signal that includes an output from a longitudinal acceleration sensor.

7. The braking control system as claimed in claim 1, wherein the processor is configured to receive an input signal that includes an output from a suspension height sensor of the automotive vehicle.

8. The braking control system as claimed in claim 1, wherein the processor is configured to determine a weight distribution for the automotive vehicle, and to further determine the braking force in dependence on the weight distribution.

9. The braking control system as claimed in claim 8, wherein the weight distribution is determined from a Gross Vehicle Mass (GVM).

10. The braking control system as claimed in claim 9, wherein the processor is further configured to receive a trailer input signal from a trailer detection system to determine if a trailer is connected to the automotive vehicle.

11. The braking control system as claimed in claim 8, wherein the weight distribution is based on the output from a suspension height sensor and a longitudinal acceleration sensor.

12. The braking control system as claimed in claim 1, wherein the processor is further configured to determine the braking force in dependence on a coupling torque history of an associated driving cycle.

13. The braking control system as claimed in claim 1, wherein the coupling arrangement is a clutch mechanism.

14. The braking control system as claimed in claim 13, wherein the processor is configured to receive an input from a range change unit of a vehicle drivetrain, and wherein the processor is configured to release the braking force when the range change unit indicates a range change.

15. The braking control system as claimed in claim 1, wherein the braking force to be applied to the front wheels of the automotive vehicle is applied through the coupling arrangement.

16. A vehicle comprising the braking control system as claimed in claim 1.

17. A method of applying a braking force to front wheels of a vehicle having a coupling arrangement for coupling rear wheels of the vehicle to the front wheels of the vehicle, the method comprising:

receiving a first signal indicative of a nature of a terrain on which the vehicle is parked, wherein the nature of the terrain includes an incline of the terrain and one or more additional indicators of the nature of the terrain;

determining, dependent on the first signal, a braking force to be applied to the front wheels of the vehicle to brake the vehicle securely;

providing an output signal to the coupling arrangement to apply the determined braking force to the front wheels of the vehicle;

receiving a second signal indicative of whether a park brake of the vehicle is applied to the rear wheels of the vehicle; and disabling the output signal to the coupling arrangement in the event that the park brake is not applied.

18. A non-transitory, computer-readable storage medium storing instructions thereon that, when executed by one or more electronic processors, causes the one or more electronic processors to carry out the method of claim 17.

19. A controller for controlling a braking system of a vehicle, the controller comprising:

an electronic processor having an electrical input for receiving: a first signal indicative of a nature of a terrain on which the vehicle is parked, wherein the nature of the terrain includes an incline of the terrain and one or more additional indicators of the nature of the terrain;

an electronic memory device electrically coupled to the electronic processor and having instructions stored therein;

the electronic processor being configured to access the electronic memory device and execute the instructions stored therein such that the electronic processor is operable to:

control the braking system in response to receiving a second signal indicative of a terrain the vehicle is travelling on;

determine, depending on the second signal, a braking force to be applied to front wheels to brake the vehicle securely; and provide an output signal to the coupling arrangement to apply the determined braking force to the front wheels;

wherein the electronic processor is configured to receive a third signal indicative of whether a park brake of the vehicle is applied to rear wheels of the vehicle and disable the output signal in the event that the park brake is not applied.

\* \* \* \* \*

UNITED STATES PATENT AND TRADEMARK OFFICE
CERTIFICATE OF CORRECTION

PATENT NO. : 10,988,121 B2
APPLICATION NO. : 16/082781
DATED : April 27, 2021
INVENTOR(S) : Sam Burt et al.

Page 1 of 1

It is certified that error appears in the above-identified patent and that said Letters Patent is hereby corrected as shown below:

In the Claims

In Claim 19, Column 10, Line 63; delete "to the coupling arrangement"

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*